(12) United States Patent
Serra et al.

(10) Patent No.: US 7,937,357 B2
(45) Date of Patent: May 3, 2011

(54) METHOD AND DEVICE FOR REPRODUCTION OF INFORMATION

(75) Inventors: Merce Serra, Erlangen (DE); Olaf Korte, Igensdorf (DE); Alexander Zink, Stegaurach (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1231 days.

(21) Appl. No.: 11/583,497

(22) Filed: Oct. 19, 2006

(65) Prior Publication Data
US 2007/0078730 A1    Apr. 5, 2007

Related U.S. Application Data

(63) Continuation of application No. PCT/EP2005/003959, filed on Apr. 14, 2005.

(30) Foreign Application Priority Data

Apr. 28, 2004  (DE) .......................... 10 2004 020 878

(51) Int. Cl.
*G06F 9/44* (2006.01)
*G06N 5/00* (2006.01)
(52) U.S. Cl. ................. 706/52; 706/46; 706/45
(58) Field of Classification Search .......... None
See application file for complete search history.

(56) References Cited

FOREIGN PATENT DOCUMENTS

| EP | 1 193 663 A2 | 4/2002 |
|---|---|---|
| EP | 1 271 371 A2 | 1/2003 |
| JP | 02-235176 | 9/1990 |
| JP | 02-108918 | 4/2002 |
| JP | 03-140664 | 5/2003 |

OTHER PUBLICATIONS

Ardissono et al., "Inttrigue: Personalized Recommendation of Tourist Attractions for Desktop and Handset Devices", 2003.*
Schmidt-Belz et al., "Location-based mobile tourist service—first user experiences", 2003.*
Mooney et al., "Content-Based Book Recommending Using Learning for Text Categorization", 2000.*
Lee et al., "Personalized Contents Guide and Browsing based on User Preference", 2002.*
Bederson et al., B., "Audio Augmented Reality: A Prototype Automated Tour Guide", Chi '95 Mosaic of Creativity, pp. 210-211, May 7-11, 1995.*

(Continued)

*Primary Examiner* — Michael B. Holmes
*Assistant Examiner* — Adrian L Kennedy
(74) *Attorney, Agent, or Firm* — Beyer Law Group LLP (57) ABSTRACT

Provision is made for an information reproduction scheme which is intelligent and adjusts to the desires and needs of the user in a manner which is almost unnoticeable to the user and is associated with little or no additional effort on the part of the user, in that the selection, from pieces of information or a plurality of pieces of information, of the information to be reproduced is performed randomly on the basis of an adaptive probability distribution, and the adaptive probability distribution is adapted based on a captured behavior of the user upon the reproduction of the information selected. Consequently, the user's behavior is used as a controlled variable for adapting the adaptive probability distribution, the latter one defining, among the reproducible information and/or those information objects wherein the reproducible information is provided, the likelihood that a specific piece of information provided in an information object will or will not be selected in the next random selection for the next piece of information to be reproduced.

32 Claims, 2 Drawing Sheets

OTHER PUBLICATIONS

Nasraoui et al., O., "Combining Web Usage Mining and Fuzzy Inference for Website Personalization", University of Memphis, pp. 1-10, 2003.*

Carbo et al., J., "Agent-based Collaborative Filtering Based on Fuzzy Recommendations", Web Engineering and Technology, pp. 1-13, 2004.*

JPO; Translation of Office Action dated Sep. 16, 2009; Patent App. No. 2007-509915.

English translation of the IPEA report for PCT/EP2005/003959; Filing date Apr. 14, 2005.

* cited by examiner

FIGURE 1

METHOD AND DEVICE FOR REPRODUCTION OF INFORMATION

CROSS-REFERENCE TO RELATED APPLICATION

This application is a continuation of copending International Application No. PCT/EP2005/003959, filed Apr. 14, 2005, which designated the United States, and was not published in English and is incorporated herein by reference in its entirety.

BACKGROUND OF THE INVENTION

1. Field of the Invention

The present invention relates to reproduction of information, such as reproduction of audio and/or video data, and in particular to an intelligent and improved manner of reproducing information from a plurality of items of information, such as a plurality of news, pieces of music or video clips, the present invention also relating, however, to the reproduction of information of such kinds as occur in home replenishment systems, i.e. automatic ordering systems for private households, specifically re-ordering foodstuffs.

2. Description of Prior Art

Particularly in the field of the internet, there are various methods of presenting, on demand or unsolicited, such information to an internet user, from the abundance of information available on the internet, which is most likely to interest said user on the ground of his/her personality, i.e. methods offering personalized content. Many of these methods either provide content on demand, i.e. in accordance with precise specifications, or provide content in accordance with a set detailed profile.

Other methods, in turn, divide their resources among various users and establish a correlation of the selection made by each user. Thus, object recommendations made by other users who have requested similar contents may be offered in addition to the content explicitly requested.

The disadvantages of the existing methods are, on the one hand, the necessity of precise requests or very detailed settings, and, on the other hand, the lack of adaptability to different environments and/or situations. In addition, the user must know the respective system well to be able to input complex settings.

There is thus a need for an improved scheme for information reproduction and/or selection which is able to reproduce to persons those pieces of information, from a plurality of pieces of information, which are best adapted to their respective personality profiles, in a manner which is adjusted to their respective personalities, without demanding high-effort settings on the part of the user and/or the person. The ideal option would be an information reproduction and/or selection scheme which, without the user noticing, selects those pieces of information, from the abundance of information available, which come closest to the desires and needs or, generally, the individualities of the users.

SUMMARY OF THE INVENTION

It is thus the object of the present invention to provide an information reproduction scheme which requires only little or no additional effort on the part of the user in order to adjust the information reproduction to the user.

In accordance with a first aspect, the invention provides a device for reproducing information provided in information objects, including:

a selector for randomly selecting an information object on the basis of an adaptive probability distribution to obtain a selected information object;

a reproducer for reproducing a piece of information provided in the information object selected;

a capturer for capturing a user's behavior upon the reproduction of the information provided in the information object selected; and an adaptor for adapting the adaptive probability distribution on the basis of the behavior captured, wherein each information object has category association data associated with it which associates it with one or several categories from a set of categories, the probability distribution being at least partly defined by a weighting association specification which associates at least one weighting value with each category, and the selector for randomly selecting being configured to perform the selection in dependence on the weighting association specification and the category association data associated with the information object selected, wherein the device further includes a capturer for capturing a situation-related parameter which describes a situation in which the user's captured behavior occurs to obtain a captured value for the situation-related parameter, the weighting association specification associating, with each category, one weighting value, respectively, for different possible values of the situation-related parameter, and the selector for randomly selecting being configured to perform the selection in dependence on the weighting association specification, the captured value of the situation-related parameter, and the category association data associated with the object selected.

In accordance with a second aspect, the invention provides a method of reproducing information provided in information objects, the method including the steps of:

randomly selecting an information object on the basis of an adaptive probability distribution to obtain a selected information object;

reproducing a piece of information provided in the information object selected;

capturing a user's behavior upon the reproduction of the information provided in the information object selected; and on the basis of the behavior captured, adapting the adaptive probability distribution, wherein each information object has category association data associated with it which associates it with one or several categories from a set of categories, the probability distribution being at least partly defined by a weighting association specification which associates at least one weighting value with each category, and the step of random selection being performed such that the selection is dependent on the weighting association specification and the category association data associated with the information object selected, wherein the method further includes the steps of capturing a situation-related parameter which describes a situation in which the user's captured behavior occurs to obtain a captured value for the situation-related parameter, the weighting association specification associating, with each category, one weighting value, respectively, for different possible values of the situation-related parameter, and the selector for randomly selecting being configured to perform the selection in dependence on the weighting association specification, the captured value of the situation-related parameter, and the category association data associated with the object selected.

In accordance with a third aspect, the invention provides a computer program having a program code for performing the method of reproducing information provided in information objects, the method including the steps of:

randomly selecting an information object on the basis of an adaptive probability distribution to obtain a selected information object;

reproducing a piece of information provided in the information object selected;

capturing a user's behavior upon the reproduction of the information provided in the information object selected; and on the basis of the behavior captured, adapting the adaptive probability distribution, wherein each information object has category association data associated with it which associates it with one or several categories from a set of categories, the probability distribution being at least partly defined by a weighting association specification which associates at least one weighting value with each category, and the step of random selection being performed such that the selection is dependent on the weighting association specification and the category association data associated with the information object selected, wherein the method further includes the steps of capturing a situation-related parameter which describes a situation in which the user's captured behavior occurs to obtain a captured value for the situation-related parameter, the weighting association specification associating, with each category, one weighting value, respectively, for different possible values of the situation-related parameter, and the selector for randomly selecting being configured to perform the selection in dependence on the weighting association specification, the captured value of the situation-related parameter, and the category association data associated with the object selected, when the computer program runs on a computer.

The present invention is based on the findings that it is possible to provide an information reproduction scheme which is intelligent and adjusts to the desires and needs of the user in a manner which is almost unnoticeable to the user and is associated with little or no additional effort on the part of the user, when the selection, from pieces of information or a plurality of pieces of information, of the information to be reproduced is performed randomly on the basis of an adaptive probability distribution, and the adaptive probability distribution is adapted based on a captured behavior of the user upon the reproduction of the information selected. Consequently, the user's behavior is used as a controlled variable for adapting the adaptive probability distribution, the latter one defining, among the reproducible information and/or those information objects wherein the reproducible information is provided, the likelihood that a specific piece of information provided in an information object will or will not be accepted in the next random selection for the next piece of information to be reproduced.

The additional effort to be made by the user which is associated with providing, in the form of an evaluating behavior, the controlled variable for the adaptation of the probability distribution may be kept small in this case or is completely done away with. In accordance with a specific embodiment, an actuating means for the user is provided to be able to express that the reproduction of the current information is to be cancelled, and a new piece of information is to be reproduced, i.e. a kind of SKIP key. Actuating this means, which is implemented as a simple button in accordance with the specific embodiment, is evaluated as a rejecting behavior on the part of the user, whereas non-actuation of this means during the reproduction of a specific piece of information is taken to represent approving and/or welcoming behavior on the part of the user. Any additional effort to be made by the user is avoided hereby, since anyway the user would have operated an actuation means to select a next information object by himself/herself. On the contrary, ideally, adapting the probability distribution as a function of the rejecting or approving behavior captured will result in that at some point in time the user will hardly have to react in a rejecting manner by actuating the actuating means.

In the event of a rejecting behavior on the part of the user, the probability distribution is modified such that the reproduction of the information of the information object which has just been reproduced will be less likely the next time and that at the same time the reproduction of information of such information objects which more or less belong to one same category as the information object which has just been reproduced will also be less likely. To this end, each information object includes, for example, category association data which associates the information object with one or more categories from a predetermined set of categories. Then, the probability distribution will be defined, for example, by a weighting association specification which associates with each category at least one weighting value indicating the level of likelihood that information objects associated with this category will be selected the next time.

In accordance with a specific embodiment of the present invention, the category association data, in turn, is formed by a set of category weightings which associate the respective information object with the individual categories with a respective category weighting. Thus, a live recording from a musical may be classified, for example, as entertainment and as music, if need be, to differing degrees and/or with different category weightings. Therefore, in this embodiment, a negative behavior on the part of the user has the most repercussions for such information objects—except for that information object for whose information the user has shown the rejecting behavior—which are associated with the same category, or categories, and/or, to be more precise, which are associated with the same category weighting(s) with the highest category weighting.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 1:
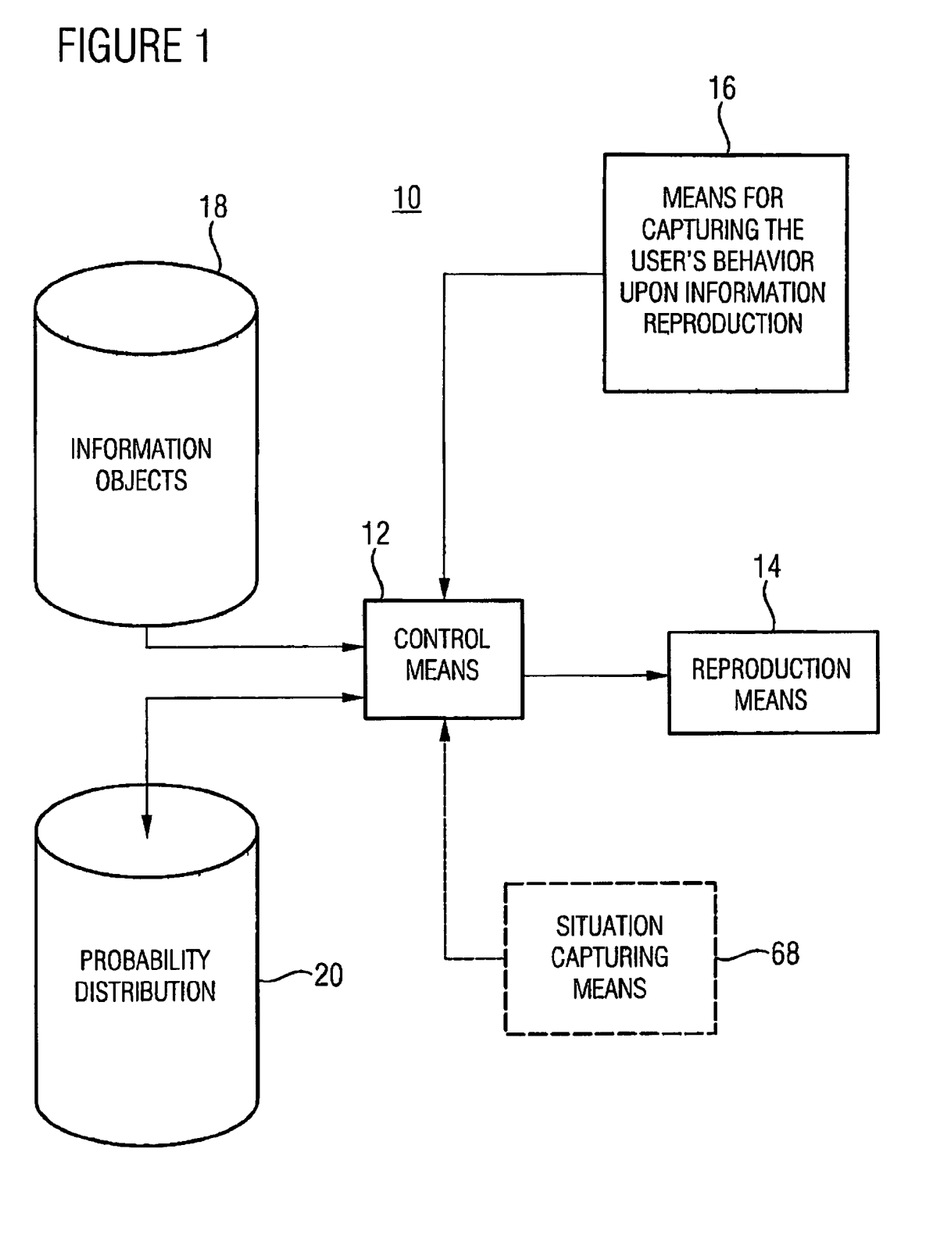
FIG. 1 is a block diagram of a device for information reproduction in accordance with an embodiment of the present invention.

Initially, FIG. 1 shows the fundamental architecture of a device for information reproduction in accordance with an embodiment of the present invention.

As can be seen, the information reproduction device of FIG. 1, which is generally indicated by 10, includes a control means 12, a reproduction means 14, a means 16 for capturing a behavior on the part of the user of device 10 upon an information reproduction by means of reproduction means 14, a memory 18 for storing a plurality of information objects, wherein one reproducible piece of information is provided, respectively, and a memory 20 which has data stored therein required by control means 12 for adapting the choice of information to the user's personality, such as a probability distribution, as will be explained in more detail below.

Having described the architecture of device 10 with regard to its components, a description will be given below of its mode of operation and the interaction of its components.

The information reproduction device 10 of FIG. 1 is provided to autonomously, i.e. without immediate interaction on the part of the user with regard to choosing the information objects to be reproduced, select information objects successively, intermittently or in any other order from the plurality of information objects provided in memory 18, and to reproduce the information provided in the information objects selected. The selection here is performed by control means 12, which, to this end, exhibits a possibility of accessing the information objects in memory 18. Reproduction is performed by reproduction means 14, which is controlled by control means 12 for this purpose.

Figure 2:
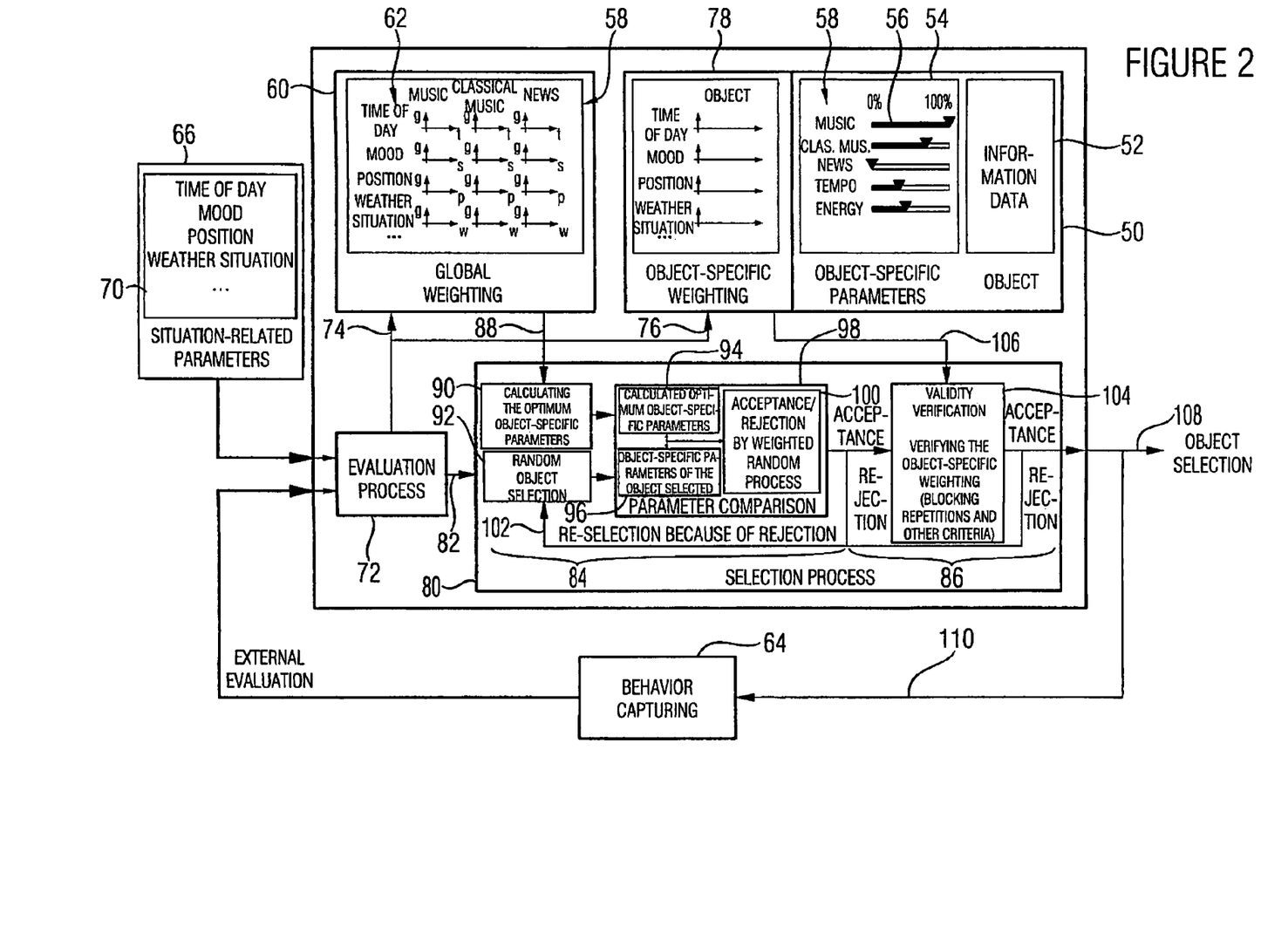
FIG. 2 is a basic diagram for illustrating a mode of operation of the device of FIG. 1 in accordance with a specific embodiment of the present invention.

In order that the selection operations be not performed purely randomly or by criteria not matched to the personality of the user, memory 20 has one probability distribution stored therein which defines, for each information object 18, the level of likelihood that this information object will be selected, and accepted, in the selection (cf. 106 in FIG. 2). The probability distribution stored in memory 20 is adaptive so that the control means is effectively connected to memory 20 not only for reading, but also for writing, so as to be able to adapt this probability distribution as will be described further down. For adapting the probability distribution 20, control means 12 uses data about the user's behavior upon the reproduced information of the information objects selected which it obtains from means 16.

The type of information provided in the information objects, the reproduction of this information in reproduction means 14, and the user's behavior following the information reproduction may take a vast variety of forms and shapes, depending on the purpose for which information reproduction device 10 is used. To be able to better illustrate the description of the mode of operation of device 10 of FIG. 1, however, it shall be assumed, in the following, that information reproduction device 10 of FIG. 1 is one which is provided to reproduce audio data, e.g. as a radio in a vehicle. In this case, for example, the information reproduced in the information objects consists of audio data, such as MPEG files or the like.

The audio data itself, in turn, may be entirely different from information object to information object and may relate to, for example, news, pieces of music, advertisements, commentaries, comedy, traffic news, radio plays or weather forecasts. To be able to roughly classify and/or subdivide the abundance of information objects and thus to summarize information objects into groups, each information object also includes, in addition to its actual information, category association data which associates each information object either by degrees, specifically via a weighting, or in absolute terms, by yes or no, with one or more of a predetermined set of categories. Possible category classifications includes, for example, "music", "classical music", "news", "tempo", "energy", etc. and/or the above-mentioned terms of different types of audio data as has been used above to represent the variety and diversity of the different audio data. The set of categories may be expandable or fixed.

To give an example, a piece of music by the Beatles may be associated, for example, with the categories of music, tempo and energy. The individual associations, in turn, might be weighted. For example, a piece of music by the Beatles would be fully, i.e. 100%, associated with the category of "music" by the category association data, whereas it would be associated with the categories of "tempo" and "energy" to a small degree only.

In the case of an information reproduction device 10 reproducing audio data, reproduction means 14 is formed, for example, by a suitable loudspeaker such as a car loudspeaker or earphones. In this case, the information and/or audio data provided in the information objects is reproduced immediately to the user, i.e. the reproduction addressee and the location of the reproduction result are in one and the same place, i.e. with the user. As will be shown with reference to a further example of application of device 10, this need not necessarily be the case.

In accordance with the audio data embodiment, the probability distribution in memory 20 is defined by a weighting association specification which associates at least one weighting value with each group of information objects defined by an association with a specific category, and/or associates at least one weighting value with each category. These weighting values are used by control means 12 in the random selection of the next information object to be reproduced from the information objects in memory 18 in that control means 12 is more likely to select information objects associated with a category, or with categories, whose weighting value is larger in accordance with the weighting association specification or weighting association table in memory 20. For determining the probability distribution as is defined by the weighting values of the weighting association specification in memory 20, the control means may also use the above-mentioned category weightings, if they exist, which more or less associate the information objects with the individual categories by degrees.

In addition, control means 12 may take into account that some categories are broader and some categories are narrower. For example, the category of "music" is applicable to more information objects than is the category of "rock", since the latter is a pure subset of the category of music. From that point of view, however, the weighting value for the category of "rock" is more applicable to the information objects associated therewith than is the weighting value for the weighting category of music, and this may be taken into account by control means 12 by means of category size weighting values which are associated with the individual categories and are also utilized in selecting and/or for defining the probability distribution among the information objects.

The process of selection conducted by control means 12 which, as has been described above, is performed at random by control means 12 on the basis of the probability distribution in memory 20, may be conducted on demand on the part of the user, upon reaching the end of an audio file which has just been reproduced, or in a manner controlled by a different system, such as by a means monitoring the traffic density which allows audio reproduction only in low-density traffic.

Once control means 12 has made a selection, it will output the audio information of the selected information object to reproduction means 14, which, in turn, will reproduce the audio information to the user.

If the probability distribution, which is the basis of the selection process by control means 12, by means of which the information objects are selected, the audio contents of which are successively or intermittently output, or reproduced, to the user, remained unchanged, there would be a high risk that the user must gets annoyed about the fact that he/she is "pestered" with audio information which he/she does not want to hear in accordance with his/her personality. Thus, in other words, the user inwardly rejects some of the pieces of information reproduced, whereas he/she approves of, or welcomes, other ones or their reproduction. In other words still, the user of device 10 evaluates any information reproduced, or the corresponding information object, with an external evaluation that could be paraphrased by "good", "bad" or "average". In order to render the user's inward evaluation detectable for device 10 and to be able to use it as an adaption feedback quantity, means 16 captures the user's behavior upon the information reproduction. This external behavior on the part of the user may then be evaluated or interpreted, i.e. as a rejecting behavior on the part of the user, which means that the user did not like the information reproduced, or as an approving behavior, which means that the user welcomed the information reproduced and/or liked it.

In the simplest case, means 16 may consist of a button that the user may actuate to indicate to device 10 that he/she does not like the information reproduced. The actuation could then be used, at the same time, by control means 12 for performing, in response thereto, a renewed selection of an information object based on an adapted probability distribution, as will be explained below. Of course, devices different from a button, such as a switch, a lever, a voice input or the like, may also be used as an actuation means. In any case, control means 12 would be able to interpret a specific actuation as a rejecting behavior on the part of the user in response to the current reproduction, possibly even with a weighting by degrees, as the situation may be. For example, the control means might draw on the amount of time that expires from the reproduction of the current audio information until the user presses the above-mentioned button, to draw conclusions therefrom as to how much the user "dislikes" the audio information currently reproduced.

If control means 12 has ascertained a rejecting behavior, it will try to adapt the probability model in memory 20 such that, in future, the selection process will be better adapted to the user's taste and preferences. In response to capturing a rejecting behavior on the part of the user, control means 12 therefore reduces, for each category with which the information object, to which the user's rejection was related, is associated, the weighting value for this category, specifically, in the event of using category weightings in the category association data of the information object that has just be reproduced, using a degree which depends on the category weighting with which this information object is associated with the individual category. In this manner, it will be less likely, for example, next time, that information objects of these categories will be selected, since the weighting values for these categories have been reduced in comparison to the weighting values for other categories.

Even though it is possible to capture only rejecting behavior on the part of the user, it is possible, additionally or alternatively, to use approving behavior on the part of the user in adapting the probability distribution in memory 20. Referring again to the above embodiment for means 16, specifically the button as means 16, control means 12 may take the fact that a button is not pressed during the reproduction of a specific piece of audio information to represent an approving behavior, i.e. such that the user welcomed and/or liked the audio information, during the reproduction of which the button was not pressed. In the event of an approving behavior, the approach by control means 12 is inverse to the preceding case: control means 12 increases the weighting values of the categories with which the information object, to which the approving behavior on the part of the user was related, is associated, possibly while taking into account the category weightings of the current information object. A further possibility would be to use two skip buttons as means 16. Actuation of one skip button, e.g. the skip-to-the-right button, would cancel the reproduction of the current object, which would be evaluated as a rejecting behavior toward the current information object. Actuation of the other skip button, e.g. the skip-to-the-left button, would cause the reproduction of the current object to be cancelled, and the reproduction of the object reproduced before the current object to be repeated, which would be evaluated as an approving behavior toward the information object reproduced before the current object.

The preceding example of means 16, i.e. a button for capturing the behavior on the part of the user upon the information reproduction, has shown that both an active reaction on the part of the user upon an information reproduction and the non-existence of a certain reaction upon the information reproduction may be evaluated as rejecting or approving behavior, respectively. Even though the non-reaction was taken to represent approving behavior above, whereas the active reaction was interpreted as a rejection, a reverse approach or a mixed approach are also possible. For example, the audio data reproduction device 10 might, as a radio in a car, also be equipped with a button provided to be pressed by the user in the event that he/she wants to express that he/she is happy to listen to the audio file being reproduced. Pressing this button several times could then be used for an evaluation by degrees in various stages. In the event of a voice input for determining the behavior, evaluations could be verbally input by the user, such as by "good", "bad", etc.

The information reproduction device 10 of FIG. 1 was described above against the background of reproducing audio data. The information reproduction device 10 of FIG. 1 will be described below against the background that same is used within the framework of a home replenishment system, specifically, for example, for reordering foodstuffs that have run out or are running low. In this case, the information objects include information containing specific instructions, i.e. instructions about the procurement and/or reordering of specific foodstuffs. The information of an information object selected by control means 12 in the selection process is forwarded by control means 12 to reproduction means 14, which in this case is configured, for example, as a modem, an internet terminal, a fax or another communication device and forwards the order defined by the information to a merchant who, in turn, will then send the foodstuffs ordered in accordance with the order to the address of the user of device 10 and/or of the home replenishment system, for example by mail or any other delivery service. All of the foodstuffs delivered to the user and ordered by means of the home replenishment system will eventually arrive at the user's fridge (not shown). In the event that the information reproduction device 10 is used for ordering foodstuffs, the location of the reproduction receiver, i.e. the merchant, and the location of the reproduction result, i.e. the fridge and/or the user, will consequently not coincide. Association of the two locations is performed via the delivery service and the ordering connection.

In accordance with the home replenishment system embodiment, information reproduction device 10 ensures that the user's fridge is constantly filled up. In order that the foodstuffs present in the fridge be adjusted to the user's taste, for selecting, control means 12 randomly selects among the information objects in memory 18 by use of the probability distribution in memory 20, and adapts probability distribution 20 on the basis of the user behavior, as will be described below. The orders provided in the information objects in memory 18 relate to the respective orders of different foodstuffs which may be divided up into specific categories, such as into categories of "fruit", "sweet", "sour", "fatty", "light", "Indian", "vegetables", "Asian", "suitable for diabetics", "vegetarian", etc.

Each information object is now more or less associated with one or several of these categories. In memory 20, each category has a weighting value associated with it, all weighting values defining the probability distribution among the information objects in memory 18, possibly along with the category weightings of the category association data in the information objects and the above-mentioned weightings which take into account the category size.

Means 16 for capturing the user's behavior upon the information reproductions includes, for example, the withdrawal of the foodstuffs from the fridge. To this end, the fridge comprises, for example, as means 16, a barcode reader, along which the user passes a foodstuff to indicate the withdrawal of this foodstuff from the fridge. However, means 16 may also be provided as a camera comprising object recognition. In any case, control means 12 is always aware of which foodstuffs are contained in the fridge, i.e. which foods have just been withdrawn and which ones have just been placed or replaced into the fridge.

The behavior shown by the user upon the ordering and captured by means 16 is used by control means 12 to change the probability distribution in memory 20 and/or the weighting values. For example, from the circumstance that there is always fruit being left in the fridge and turning bad, control means 12 concludes that the weighting values for the categories of "fruit", "citrus fruits" etc. are to be reduced, so that the probability distribution is adapted such that in subsequent orders, fruit and the like are less likely to be ordered. Conversely, from the fact that the user immediately takes yogurt out of the fridge as soon as the yogurt is delivered into the fridge, control means 12 may conclude, for example, that the user's behavior is approving, and it may therefore, in response thereto, increase the weighting for the category of "yogurt", but also the weighting for, e.g., the category of "dairy products" or the like in memory 20.

The last-mentioned embodiment with reference to FIG. 1 clearly showed that means 16 may be configured in most varied ways. Generally, one may state that means 16 should be able to convert the user's behavior into signals, from which control means 12 may infer approving and/or rejecting behavior on the part of the user with regard to information reproduced. To this end, means 16 should be able, as has been described above, to be sensitive to specific reactions and/or non-reactions on the part of the user upon the information reproduction so as to be able to infer rejecting and/or approving behavior when capturing reactions and/or non-reactions of such a type upon information objects reproduced.

The above description has been based on the assumption that only one weighting value is stored in memory 20 for each category. Ultimately, this means that the above functional description of the device of FIG. 1 has been based on the assumption that only an adaptive probability distribution and/or an adaptive table of weighting values is used for adapting the information object selection. For many applications, this approach may lead to a satisfactory result, specifically when the user's preferences are always the same irrespective of the situation in which the user expresses his/her rejection or approval by his/her behavior. However, this is not always the case. In the previous example of use, where the device of FIG. 1 has been used as an audio information reproduction device, it is possible and also likely, for example, for a user to have different preferences and/or desires in the morning, for example sitting in his/her car on the way to work, than in the afternoon when he/she comes home from work and is tired. In this case, the adaptation result with only one weighting value per category and/or with only one adaptive probability distribution would not be sufficient, since the probability distribution cannot adapt to fixed preferences or desires on the part of the user at all, which, actually, are not the same in the morning and in the afternoon. This is why in the subsequent embodiment of a mode of operation of the device of FIG. 1, several weighting values and/or several adaptive probability distributions are ultimately provided for each category which are provided for different situations the user finds himself/herself in. A situation-dependent parameter suited to describe the situation that the user is currently in is, in the preceding audio reproduction example, time, for example. In the example of the home replenishment system as has been described above, it is useful, for example, to differentiate between "summer" and "winter", since it is quite possible and likely for the user's diet preferences to differ in summer and winter, since it is often the case that people eat lighter food in the summer, for example more salads, whereas they will eat more solid foods, for example more roasts, in winter. Eating habits may be different, for example, on working days than at weekends. Further situation-related parameters may be the time of the year, the day of the week and further environment parameters relevant to the respective application.

Therefore, the mode of operation of the device of FIG. 1 will be described in more detail, with regard to FIG. 2, with reference to a further embodiment, wherein said device acts as an audio reproduction device. In accordance with this embodiment, each information object 50 among the information objects stored in memory 18 includes, in addition to information data 52, wherein the actual information of the information object 50 is provided, object-specific parameters 54 corresponding to the category association data mentioned above which describe the actual information contained in the information data 52 and which comprise the category weightings 56, also mentioned above, each of which is associated with a specific one of categories 58 and gives an indication, for said specific one of categories 58, as to how much the information object 50 is associated with said category 58. The categories listed in FIG. 2 by way of example are music, classical music, news, tempo and energy. By way of example, category weightings 56 are indicated in percent, even though other notations are also possible.

Global weighting data 60 stored in memory 20 serves to define the adaptive probability distribution. For each category 58, this global weighting data includes not only one weighting value, as has been described above with reference to FIG. 1, but a plurality of weighting values associated with different possible values of a situation-related parameter. To be able to classify the situations the user is in in even more detail, several situation-related parameters 62 are provided in accordance with the embodiment of FIG. 2, and, for each of these situation-related parameters 62, the global weighting data 60 in memory 20 includes a plurality of weighting values per category 58, specifically one weighting value per possible quantization value of the respective situation-related parameter. Exemplary examples of situation-related parameters 62 are indicated in FIG. 2 by "time of day", "mood", "position" and "weather situation". If, for example, $N_K$ is the number of categories 58, $N_{SP}$ is the number of situation-related parameters 62, and $n_{SP}(1)$ is the number of distinguishable quantization values for the first situation-related parameter, $n_{SP}(2)$ is the number of quantizations for the second situation-related parameter, etc., then the global weighting data 60 would be comprised of a number of $$N_K \cdot \sum_{i=1}^{N_{SP}} n_{SP}(1)$$

weighting values.

Instead of storing the global weighting data 60 in a tabular form, it would also be possible, as indicated in FIG. 2, that for each tuple of category 58 and situation-related parameter 62, an analytical course of the function is stored which maps from respective situation-related parameter t for the time of day, s for the mood, p for the position, and w for the weather situation, respectively, to a weighting value g.

Now that the differences regarding the definition of the probability distribution by weighting values in memory 20 with regard to the embodiments described with reference to FIG. 1 have been discussed above with respect to FIG. 2, the mode of operation of the device of FIG. 1 will be described below within the framework of the embodiment of FIG. 2. In the embodiment of FIG. 2, too, device 10 is provided to successively randomly select information objects from the plurality of information objects in memory 18 using an adapted probability distribution as defined by the global weighting 60, and to adapt the global weighting data 60, on the basis of the user behavior upon the reproduction of the information in the information objects selected.

Unlike the embodiments described with immediate reference to FIG. 1, device 10 also captures, in accordance with the embodiment of FIG. 2, along with the user behaviors upon the information reproduction, as they are captured in a user behavior-capturing process 64, the present situation-related parameters in a situation-capturing process 66. Capturing of the situation-related parameters is performed by a situation parameter capturing means 68 represented by dashed lines in FIG. 1. The result of the situation-capturing process 66 are captured values for the situation-related parameters, i.e. in this case the present time of the day, the user's present mood, the user's present position and the present weather situation. To this end, device 68 may comprise a clock for capturing the time of day, a voice analyzer having pattern recognition, a camera device, a heart-frequency sensor at the steering wheel, a voice recorder or a means for generally evaluating behavior patterns for recognizing the user's voice, a GPS sensor for detecting the user's position, and a combined brightness, humidity, air pressure and wind speed sensor for detecting the weather situation. The present values of the situation-related parameters are indicated by 70 in FIG. 2.

As soon as behavior capturing 64 captures a rejecting or approving behavior on the part of the user, which obviously represents an "external evaluation" of the present selection among the information objects 50, this external evaluation, along with the associated current values 70 of the situation-related parameters, enters into an evaluation process 72. The evaluation process 72 takes on the adaptation of the weighting values, which has already been described above with reference to FIG. 1 within the framework of the preceding embodiments. Adaptation of the weighting values on the basis of the external evaluation and the current values 70 of the situation-related parameters is illustrated by an action arrow 74. Adaptation 74 is performed in the following manner. If the behavior capturing 64 yielded a negative external evaluation, or a rejecting behavior toward information object 50 whose information data 52 is being reproduced, the evaluation process 72 will use the object-specific parameters 54 of this current information object 50 and the current values 70 of the situation-related parameters to adapt global weighting table 60.

In particular, in the event of a rejecting behavior on the part of the user, evaluation process 72 will act upon global weighting table 60 such that, subsequently, it is less likely that information objects having object-specific parameters 54 which are similar to the current information object 50 will be selected, but only as long as the situation is the same or similar, i.e. for all cases where the situation-related parameters have values similar to the current values 70, and/or only for such weighting values in memory 20 which are associated with situation-parameter values identical with or similar to the current ones 70. In more specific terms, among all weighting values associated with one and the same category 58 and with one and the same situation-related parameter 62, the evaluation process 72 will reduce those the most which come closest to the current value of this situation-related parameter. In other words, the severity of the adaptation on the grounds of the user's rejecting behavior decreases as the deviation of the situation to which the respective weighting value relates from the current situation 70 increases. This takes into account that a user who has, for example, decided against a piece of rock music in the morning, specifically, for example, at 8 am, might have probably made the same decision also at 9 am and perhaps even at 10 am still; but at midday, for example, in his/her midday break at work, he/she may want to listen to rock music again. The rejecting behavior on the part of the user thus radiates somewhat during the adaptation 74, so as to also affect weighting values relating to similar situations. In this manner, adaptation may be accelerated.

Among the weighting values which relate to the same situation, i.e. to the same possible value of a respective situation-related parameter 62, the evaluation process 72 will reduce those weighting values the most which relate to a category with which the current information object 50 is associated the most because of its object-specific parameters 54, i.e. the category weighting 56 of which is highest in the object-specific parameters 54 of this object 50. This takes into account that a rejecting behavior toward a piece of rock music is not to result in that news are played less often, but, of course, predominantly in that pieces of rock music and similarly high-energy pieces of music are less likely to be played. A different example would be the rejection of a piece of music which may be 100% associated with pop but also has a 20% jazz influence. In this example, the weighting would only have a 20% effect on the global jazz evaluation. As has been described above, the adaptation 74 may also be influenced by weightings fixedly associated with the categories 58 so as to take into account that some categories relate to the multiplicity of objects, whereas some categories may relate to only a smaller group of objects because they are pure subgroups of the former and are therefore more specific.

In the event of a positive external evaluation, or an approving behavior on the part of the user, the evaluation process 72 in the adaptation 74 is exactly the other way round than in the previous description, specifically in that the values are increased instead of being reduced, and the adaptation is done in the same manner, i.e. the closer the value of the situation-related parameter, to which the respective weighting value relates, comes to the current value 70, the more the values are increased, and the higher the category weighting 56 is for that category, to which the respective weighting value relates, in the object-specific parameters 54 of the object 50 to which the approving behavior relates, the more the values are increased.

The further description of FIG. 2 will be based on the assumption that, for behavior capturing 64, a behavior-capturing means 16 is used which is configured as a button used by the user to cancel the reproduction of a current information object and to thus express a rejecting behavior. If the user does not actuate the button while an information object is played back, this is evaluated as a positive behavior.

If the user presses the button of behavior-capturing means 16, the evaluation process 72 will enter this, within the framework of an update 76, into an object-specific weighting table 78 stored in memory 20, for example along with global weighting table 60. The evaluation process 72 stores any rejecting behavior on the part of the user in the object-specific weighting table 78. In particular, in the event of a rejecting behavior on the part of the user, the evaluation process 72 will enter an index for the information object 50 to which the rejecting behavior was related into the object-specific weighting table 78 along with the current values 70 of the situation-related parameters where the rejecting behavior occurred. Logging the rejecting behavior serves to adapt the information object selection process more quickly, as will be discussed in more detail below. Table 78 is limited in its size. Therefore, when entering a current rejecting behavior on the part of the user, the evaluation process 72 displaces an old entry of a previous rejecting behavior by means of a suitable displacement strategy, such as an FIFO (first in first out) strategy or the like. The size of table 78 may include, for example, 1,000 entries on rejecting behavior.

As was indicated above, it shall be assumed, in the following, that in the embodiment of FIG. 2, the user expresses rejection by pressing a button. The button being pressed will then result in the above-mentioned updates 74 and 76. In addition, however, the button being pressed triggers the next selection process 80, since the user, by pressing the button, not only expresses a rejecting behavior, but also communicates to the system that same is to stop and interrupt the current reproduction and is to reproduce a new information object instead. Triggering by pressing the button is indicated by arrow 82 in FIG. 2. The selection process 80 of FIG. 2 is a two-stage selection process. The first stage, indicated by 84 in FIG. 2, corresponds to the selection process, which has already been described with regard to FIG. 1, based on the global weighting 60. The second stage, indicated by 86 in FIG. 2, is based on the object-specific weighting 78.

In accordance with the embodiment of FIG. 2, the first stage 84 of selection process 80 is performed by control means 12 in the following manner. Initially, control means 12 draws on the global weighting data (88) to calculate, in a calculation process 90, such object-specific parameters which have, in accordance with the global weighting data 60, the highest probability associated with them. In other words, control means 12 calculates, in the calculation process 90, a set of category weightings 56 such that, according to the probability distribution defined by the global weighting data 60, this set has the highest selection probability associated with it, specifically in relation to the current values 70 of the situation-related parameters. If, among the information objects in memory 18, there actually were such an object with such object-specific parameters, this would therefore be most likely to be accepted, taking into account the present situation. In a different situation, of course, the calculation process 90 would lead to a different set given the same global weighting data. The resulting set of category weightings thus indicates, in other words, a situation-related degree of rejection/acceptance of each category association.

Irrespective thereof, control means 12 randomly selects, in a random process 92, among the information objects in memory 18. The random process 92 selects each information object, for example, with the same probability. However, a different probability distribution could be provided for step 92 which, however, is fixed, unlike the adaptive probability distribution.

Both processes 90 and 92 lead to two sets of category weightings, specifically a calculated optimum object-specific parameter set and/or an optimum set 94 of category weightings from the calculation process 90 which, as has been described above, is situation-dependent, and a set 96 of category weightings which corresponds to the object-specific parameters 54 of the information object 50 selected in the random process 92. Both sets 94 and 96 are the input data for a parameter comparison 98 conducted by control means 12 to conclude the first stage 84 of the selection process 80. In particular, in the parameter comparison 98, a probability value is formed from the two sets 94 and 96 by means of, for example, scalar multiplication of the two category weighting vectors 94 and 96, and said probability value is drawn upon in a random process 100 so as to randomly accept or reject, on the basis of this probability value, the object selected in the random process 92. The probability of the information object selected in the random process 92 being accepted is the higher, the more the object-specific parameters 96 of the object selected correspond to the optimum object-specific parameters 94.

In the event that the random process 100 of the parameter comparison 98 leads to a rejection, processes 90 and 92 are performed again, as is indicated by an arrow 102 marked by "re-selection because of rejection". In the event that the object randomly selected in step 92 is accepted in the parameter comparison 98, this information object is fed to a further acceptance/rejection stage, i.e. the second stage 86 of selection process 80, this sequence being indicated in FIG. 2 by an arrow headed "acceptance".

Stage 86 includes a validity verification process 104 which is based, among other things, on the object-specific weighting data 78, as is indicated by an arrow 106. The validity verification 104 is either random and/or absolute. For example, in the validity verification 104, a verification is performed as to whether data 78 contains an entry relating to the information object selected in the first stage 84 of the selection process 80, and whether this entry exhibits values for the situation-related parameters 62 which differ by no more than a predetermined measure from the current values 70. This would mean that, in the recent past, the user rejected this very information object in a similar situation. In the event of a deterministic validity verification 104, this could lead to rejection. In the event of a weighted random process 104, the rejection could vary, in terms of its probability, depending on the differentiation of the current values 70 and the values, found in the entry of table 78, for the situation-related parameters. In this manner, the validity verification has the effect that the slower adaptation 74 has a faster adaptation 76 connected upstream from it.

The validity verification 104 may also draw upon further criteria for validity verification. For example, in a further list, not shown in FIG. 2, evaluation process 72 logs the information objects reproduced. Immediate repetition of these information objects within a period of, e.g., two hours, could then be avoided, for example, in the validity process 104 in that the object which has passed stage 84 is rejected in stage 86. In addition, validity verification process 104 could also draw upon data in the object currently to be verified itself so as to make a decision of acceptance or rejection. With news information objects, for example, the age of the news or the topicality of the news, could be included into process 104. Less recent news would be less likely to pass through the validity verification process 104 and be accepted.

If validity verification process 104 results in a "rejection", selection process 80 will start again at processes 90 and 92, as is indicated by arrow 102. With each rejection, the strictness of the verification of the rejection criteria for the following run is reduced to ensure that a selection will be made after a maximum number of runs. However, if the object also has passed the second stage 86 with "acceptance", this object will be the object selected in the selection process and will be output as an object selection result to reproduction means 14, as is indicated by an arrow 108. From the reproduction of the object selection onward, behavior capturing 64 now relates to this object that has just been selected, as is indicated by an arrow 110. Hereby, the feedback loop for adaptation 74 and 76 is closed, which includes the evaluation on the part of the user as the basis for the adaptation.

In other words, the device of FIGS. 1 and 2, respectively, results in a personalized information selection. In the embodiment of FIG. 2, the behavior on the part of the device is influenced by taking into account the situation and environmental reaction, it being possible to take 'information selection' to mean the selective storage and reproduction of information. The approach corresponds to a fed-back system which approaches the selection behavior desired following the environmental reaction to the preceding information selection. The environmental reaction is predefined using several input variables, i.e. the various environment parameters, or situation-related parameters, and the selection evaluations and/or the external evaluation. The evaluation is generated by an external evaluation means, for example the user, using the objects that have already been selected.

The information to be selected is structured and stored in the form of mutually independent objects. In the above embodiments, an object consisted of pure information data and of object-specific parameters describing the object content. The environment to which the system reacted was described by situation-related parameters.

If, for example, the device of FIG. 1 is initialized in accordance with the embodiment of FIG. 2, an object is initially selected from the quantity of available objects by means of an equally distributed stochastic random process. For subsequent stochastic selection processes, the selection probabilities 60 are adjusted as a function of the previous external evaluations and of the current situation. In more specific terms, and expressing the same thing with regard to the embodiment of FIG. 2, the selection from the memory is always made randomly, the acceptance probability being, however, continuously adjusted. The influence of an external evaluation and/or a user decision on the current selection process and/or subsequent selection processes in similar situations is the weaker, the more the current situation deviates from the situation where the evaluation was given, or made, which here will be referred to as a degressive method.

The above embodiments enable personalized selection of information while taking into account external environmental reactions without giving detailed indications of selection criteria. In these embodiments, complex active participation on the part of the users is avoided.

One possible exemplary use of a device of FIG. 1 which functions in accordance with FIG. 2 is the selection of audio objects in accordance with a user's preferences for a car radio. In addition to the pure information data 52, such as pieces of music, an audio object 50 contains object-specific parameters 54 which describe object 50, such as type of object, i.e. music, news, advertisements, etc., object length, object category, i.e. rock, classical music, techno or sports, economy, foreign countries, etc. Possible situation-related parameters 62 are the time of day, the mood of the user, the whereabouts, date/time of the year, the weather situation, etc. As has been described above, the evaluation possibility may consist in a skip button with which the user may skip the object. The audio objects 50 are offered to the user, the automatic selection approaching the user's preferences by means of the external evaluation as time goes by. For example, the system will remember that the user listens to the news in the morning or prefers Blues when it is raining.

In addition to this exemplary utilization, there are many further possibilities of application for the personalized information selection in accordance with the previous selection examples. These include, for example, the selection of the daily combination of clothes, the adjusting color design or the fragrance of a room, the selection of foodstuffs in a fridge in a so-called home replenishment system, as was shown above, etc.

With reference to the above description, it shall be noted that memory 18, which has the information objects provided therein, may be, for example, a CD, a hard disc, a DVD, a magnetic memory or any other memory which has a fixed set of information object stored therein. The set of information objects could then intermittently be changed by changing the CD or by updating the set. However, it is also possible for the memory 18 to be configured as a cache in which information objects are stored which are cyclically broadcast, e.g. via a broadcasting signal. The cyclically broadcast information objects are received at a radio receiver and then entered into the cache memory, and/or displaced again from memory 18, in accordance with a predetermined displacement strategy. The displacement strategy could use the probabilities defined by the global weighting 60, the object-specific weighting data 78 and the further criteria defined by the validity verification 104. An information object which is very unlikely to be selected in the selection process 80 in accordance with the criteria mentioned will, according to this, not be taken over into cache memory 18 or will be displaced very soon. The displacement strategy could further draw upon both data 60, 78 and the further data used by the validity verification 104, and common cache criteria for displacement, such as in accordance with the FIFO principle, i.e. it could be a modified FIFO principle or the like.

In addition, it shall be pointed out that, in deviation from the previous embodiments, the adaptation of the probability distribution is not limited to the adaptation to the user's needs and desires. It could further be possible that, for example in the case of a car radio, the information selection is not adapted, with regard to the probability distribution, by the user pressing a button in order to terminate an information object and to request a new one, but that, for example, the user's behavior behind the wheel is drawn upon to adapt the probability distribution. For example, if the aggressiveness of the user's behavior behind the wheel significantly increases upon the reproduction of a piece of rock music, this will be taken into account by adapting the probability distribution 60 in so far as it will be less likely for pieces of rock music and similar audio objects to be reproduced in similar situations. By means of such an adaptation, the safe driving of, for example, lorry drivers could be increased.

With regard to the evaluation and/or the evaluation process 72, it shall also be noted that it would also be possible for the evaluation described there of the reduction of the underlying parameters to not occur until parameters are to be calculated for a similar situation. In other words, the degression method could also occur in the selection only rather than in the evaluation.

The above-mentioned control means 12 could be, for example, a computer or an ASIC designed accordingly.

In particular, it shall be pointed out that the inventive scheme may also be implemented in software, depending on the circumstances. The implementation may be conducted on a digital storage medium, in particular a disc or a CD with electronically readable control signals able to cooperate with a programmable computer system such that the respective method is performed. Generally, the invention thus also consists in a computer program product having a program code stored on a machine-readable carrier for performing the inventive method, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for reproducing information provided in information objects, comprising:
    a selector for randomly selecting an information object on the basis of an adaptive probability distribution to obtain a selected information object;
    a reproducer for reproducing a piece of information provided in the information object selected;
    a capturer for capturing a user's behavior upon the reproduction of the information provided in the information object selected; and
    an adaptor for adapting the adaptive probability distribution on the basis of the behavior captured,
    wherein each information object has category association data associated with it which associates it with one or several categories from a set of categories, the probability distribution being at least partly defined by a weighting association specification which associates at least one weighting value with each category, and the selector for randomly selecting being configured to perform the selection in dependence on the weighting association specification and the category association data associated with the information object selected,
    wherein the device further comprises a capturer for capturing a situation-related parameter which describes a situation in which the user's captured behavior occurs to obtain a captured value for the situation-related parameter, the weighting association specification associating, with each category, one weighting value, respectively, for different possible values of the situation-related parameter, and the selector for randomly selecting being configured to perform the selection in dependence on the weighting association specification, the captured value of the situation-related parameter, and the category association data associated with the object selected.

2. The device as claimed in claim 1, wherein each information object has a set of category weightings associated with it as category association data, each category weighting of which, in turn, being associated with a category from a set of categories, and the probability distribution being at least partly defined by a weighting association specification which associates at least one weighting value with each category, and the selector for randomly selecting being configured to perform the selection in dependence on the weighting association specification and the category weightings associated with the information object selected.

3. The device as claimed in claim 1, wherein the situation-related parameter is a present time of the day, a time of the year, a day of the week, the user's present mood, the user's present position, or a present weather situation.

4. The device as claimed in claim 1, wherein the selector for randomly selecting further comprises:
    a determiner for determining optimum category association data on the basis of the adaptive probability distribution;
    a chooser for randomly choosing a candidate information object from the information objects;
    an acceptor for accepting the candidate information object as the selected information object in a random manner, in dependence on a first random decision, with a first probability which depends on the optimum category association data and the category association data associated with the candidate information object,
    the chooser for randomly choosing and the acceptor for accepting being configured to repeat the choosing and accepting if the candidate information object is rejected.

5. The device as claimed in claim 4, wherein the acceptor is configured to further perform the acceptance of the candidate information object, in dependence on a second decision, with a second probability which depends on additional data which differ from the weighting association specification and from the category association data, and to accept the candidate information object only if both random decisions are positive.

6. The device as claimed in claim 5, further comprising:
    managing unit for managing a list, wherein rejecting behaviors on the part of the user upon the reproduction of information objects or upon information objects reproduced are stored,
    wherein the acceptor is configured to use the list at least as a part of the additional data.

7. The device as claimed in claim 6, wherein the additional data includes an age of the information of the candidate information object.

8. The device as claimed in claim 4, further comprising a capturer for capturing a situation-related parameter which describes a situation in which the user's captured behavior occurs to obtain a captured value for the situation-related parameter, the weighting association specification associating, with each category, one weighting value, respectively, for different possible values of the situation-related parameter, the determiner for determining the optimum category association data being configured to perform the determination on the basis of the weighting association specification and of the captured value of the situation-related parameter to obtain a situation-dependent, optimum set of category weightings as the optimum category association data.

9. The device as claimed in claim 1, further comprising:
    a memory which has the information objects stored therein.

10. The device as claimed in claim 9, wherein the memory includes a replaceable data carrier, a CD, a DVD, a hard disc or a magnetic memory.

11. The device as claimed in claim 9, further comprising:
    a receiver for receiving information objects broadcast via a broadcasting/radio signal; and
    a replacer for replacing information objects in the memory by received information objects in accordance with a predetermined displacement strategy.

12. The device as claimed in claim 11, wherein the displacement strategy depends on the adaptive probability distribution.

13. The device as claimed in claim 1, wherein the capturer for capturing the user's behavior comprises an actuator for inputting a reaction on the part of the user.

14. The device as claimed in claim 13, wherein the capturer for capturing the user's behavior is configured to interpret the input of a reaction on the part of the user to the reproduction of the information provided in the information object selected as a rejecting behavior on the part of the user.

15. The device as claimed in claim 13, wherein the capturer for capturing the user's behavior is configured, in the event that no input of a reaction on the part of the user occurs upon the reproduction of the information provided in the information object selected, to interpret this as an approving behavior.

16. The device as claimed in claim 13, wherein the capturer for capturing the user's behavior comprises two input possibilities and is configured to interpret the input of a reaction on the part of the user to the reproduction of the information provided in the information object selected, using the first input possibility, as a rejecting behavior on the part of the user, and to interpret the input of a reaction on the part of the user to the reproduction of the information provided in the information object selected, using the second input possibility, as an approving behavior on the part of the user.

17. The device as claimed in claim 13, wherein the actuator includes a button, a microphone, a camera, a lever, or a switch.

18. The device as claimed in claim 1, wherein the information includes audio and/or video data or repeat orders for a home replenishment system.

19. The device as claimed in claim 1, wherein the adaptor is configured to, in the event that the behavior captured is a rejecting behavior, adapt the adaptive probability distribution such that information objects which are associated with a category with which the information object, in which the information reproduced is provided, is associated, are subsequently less likely to be selected by the selector for randomly selecting, and/or configured to, in the event that the behavior captured is an approving behavior, adapt the adaptive probability distribution such that information objects which are associated with a category which has the information object, in which the information reproduced is provided, associated with it, are more likely to be selected by the selector for randomly selecting.

20. The device as claimed in claim 19, wherein the adaptor is configured to perform the adaptation in dependence on a current value of a situation-related parameter which describes the situation in which the captured behavior on the part of the user occurs.

21. The device as claimed in claim 19, further comprising a capturer for capturing a situation-related parameter which describes a situation in which the user's captured behavior occurs to obtain a captured value for the situation-related parameter, the weighting association specification associating, with each category, one weighting value, respectively, for different possible values of the situation-related parameter, and wherein the adaptor is configured to perform the adaptation in dependence on the value captured, such that, for each category, the weighting values associated with this category are changed the more, the less the possible value of the situation-related parameter, for which the respective weighting value is associated with the respective category, deviates from the value captured.

22. A method of reproducing information provided in information objects, comprising:
 randomly selecting an information object on the basis of an adaptive probability distribution to obtain a selected information object;
 reproducing a piece of information provided in the information object selected;
 capturing a user's behavior upon the reproduction of the information provided in the information object selected; and
 on the basis of the behavior captured, adapting the adaptive probability distribution,
 wherein each information object has category association data associated with it which associates it with one or several categories from a set of categories, the probability distribution being at least partly defined by a weighting association specification which associates at least one weighting value with each category, and the step of randomly selecting being performed such that the selection is dependent on the weighting association specification and the category association data associated with the information object selected,
 wherein the method further comprises capturing a situation-related parameter which describes a situation in which the user's captured behavior occurs to obtain a captured value for the situation-related parameter, the weighting association specification associating, with each category, one weighting value, respectively, for different possible values of the situation-related parameter, and the step of randomly selecting being performed such that the selection is dependent on the weighting association specification, the captured value of the situation-related parameter, and the category association data associated with the object selected.

23. A non-transitory computer-readable medium having stored thereon a computer program having a program code for performing the method of reproducing information provided in information objects, the method comprising:
 randomly selecting an information object on the basis of an adaptive probability distribution to obtain a selected information object;
 reproducing a piece of information provided in the information object selected;
 capturing a user's behavior upon the reproduction of the information provided in the information object selected; and
 on the basis of the behavior captured, adapting the adaptive probability distribution,
 wherein each information object has category association data associated with it which associates it with one or several categories from a set of categories, the probability distribution being at least partly defined by a weighting association specification which associates at least one weighting value with each category, and the step of randomly selecting being performed such that the selection is dependent on the weighting association specification and the category association data associated with the information object selected,
 wherein the method further comprises capturing a situation-related parameter which describes a situation in which the user's captured behavior occurs to obtain a captured value for the situation-related parameter, the weighting association specification associating, with each category, one weighting value, respectively, for different possible values of the situation-related parameter, and the step of randomly selecting being performed such that the selection is dependent on the weighting association specification, the captured value of the situation-related parameter, and the category association data associated with the object selected, when the computer program runs on a computer.

24. A device for reproducing information provided in information objects, wherein each information object has category association data associated therewith which includes a set of category weightings, each of which is associated with a respective category from a set of categories, and indicates the extent to which the respective information object is associated with the respective category, and wherein the reproduction is controlled by a weighting association specification which associates with each category, one weighting value, respectively, per possible value of different possible values of a situation-related parameter, said device comprising:

a situation capturer configured to capture a captured value of the situation-related parameter which describes a current situation of the user, the situation-related parameter being a present time of the day, a time of the year, a day of the week, the user's present mood, the user's present position, or a present weather situation;

a selector for selecting an information object to obtain a selected information object, wherein the selector is configured to perform the selection randomly in dependence on the weighting association specification, the captured value of the situation-related parameter, and the category association data associated with the information objects such that an information object is selected more probable, the more the respective information object is, by its set of category weightings (56), associated with categories for which the weighting values of the weighting association specification, associated with the captured value, are higher;

a reproducer for reproducing a piece of information provided in the information object selected;

a reaction capturer configured to capture a user's behavior upon the reproduction of the information provided in the information object selected with the user being in the current situation, by surveillance of a user-operable interface of the device; and an adaptor configured to adapt the weighting association specification on the basis of the behavior captured.

25. The device as claimed in claim 24, wherein the adaptor is configured to adapt the weighting association specification on the basis of the behavior captured, such that, if the user's behavior is a rejecting behavior, those weighting values among those associated with the captured value are reduced the most, which are associated with a category with which the information object (50) has associated therewith the highest category weighting (56), and, if the user's behavior is an approving behavior, those weighting values among those associated with the captured value are increased the most, which are associated with a category with which the information object (50) has associated therewith the highest category weighting (56).

26. The device as claimed in claim 25, wherein the behavior capturer is configured to interpret occurrences and absences of user inputs at the user-operable interface upon the reproduction of the information as the rejecting and approving behaviors, respectively.

27. The device as claimed in claim 25, wherein the selector is configured to use the adapted weighting association specification for the selection of a next information object to be reproduced next.

28. A device for reproducing information provided in information objects, wherein category association data is associated with each information object, the category association data including a set of category weightings, each of which is associated with a respective category from a set of categories, and indicates the extent to which the respective information object is associated with the respective category, and wherein the reproduction is controlled by a weighting association specification which associates with each category, one weighting value, respectively, per predetermined value of a plurality of predetermined values of a situation-related parameter which the situation-related parameter might assume, comprising:

a first capturer configured to capture a captured value of the situation-related parameter which describes a current situation of the user;

a selector configured to select an information object to obtain a selected information object, wherein the selection is performed randomly in dependence on the weighting association specification, the captured value of the situation-related parameter, and the category association data associated with the information objects such that an information object is selected with a first probability determined by a scalar multiplication of a first vector formed by the set of category weightings associated with the respective information object and a second vector formed by the weighting values of the weighting association specification, associated with the captured value;

a reproducer configured to reproduce a piece of information provided in the information object selected;

a second capturer configured to capture a user's behavior upon the reproduction of the information provided in the information object selected with the user being in the current situation; and an adaptor configured to adapt the weighting association specification on the basis of the behavior captured, such that, if the user's behavior is a rejecting behavior, those weighting values among those associated with the captured value are reduced the most, which are associated with a category with which the information object has associated therewith the highest category weighting, and, if the user's behavior is an approving behavior, those weighting values among those associated with the captured value are increased the most, which are associated with a category with which the information object has associated therewith the highest category weighting.

29. The device as claimed in claim 28, wherein the selector further comprises:

a chooser configured to randomly choose a candidate information object from the information objects such that each information object is chosen equally probable;

an acceptor configured to accept the candidate information object as the selected information object in a random manner with the first probability determined by the scalar multiplication, the chooser and the acceptor being configured to repeat the choosing and accepting if the candidate information object is rejected.

30. The device as claimed in claim 29, further comprising manager configured to manage a list, wherein rejecting behaviors on the part of the user upon the reproduction of information objects or upon information objects reproduced are stored, wherein the acceptor is configured to perform, in a random manner, an accepting/rejecting decision on the candidate information object accepted in the random manner with the first probability, such that the candidate information object remains accepted at a second probability which depends on the list.

31. The method as claimed in claim 22, wherein the randomly selecting further comprises:

determining optimum category association data on the basis of the adaptive probability distribution;

randomly choosing a candidate information object from the information objects;

accepting the candidate information object as the selected information object in a random manner, in dependence on a first random decision, with a first probability which depends on the optimum category association data and the category association data associated with the candidate information object, wherein the choosing and the accepting are repeated if the candidate information object is rejected, wherein the accepting the candidate information object is further performed in dependence on a second decision, with a second probability which depends on additional data which differ from the weighting association specification and from the category association data, and to accept the candidate information object only if both random decisions are positive, wherein rejecting behaviors on the part of the user upon the reproduction of information objects or upon information objects reproduced are stored, and the accepting is performed such that the list is used at least as a part of the additional data, wherein the additional data includes an age of the information of the candidate information object.

32. The method as claimed in claim 22, further comprising:

receiving the information objects broadcast via a broadcasting/radio signal; and storing the information objects in a memory, with replacing information objects in the memory by received information objects in accordance with a predetermined displacement strategy, wherein the displacement strategy depends on the adaptive probability distribution.

* * * * *